Patented Jan. 15, 1929.

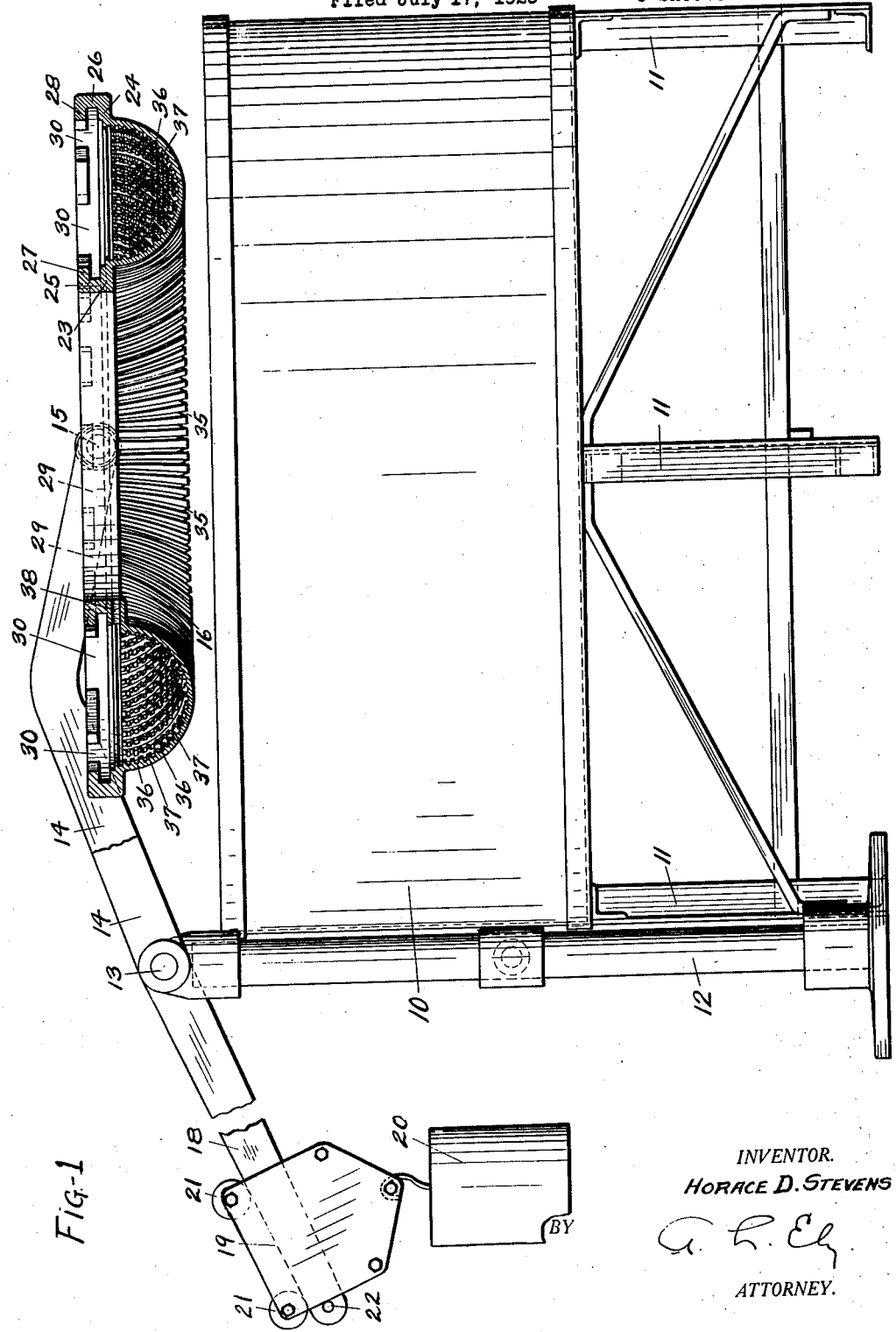

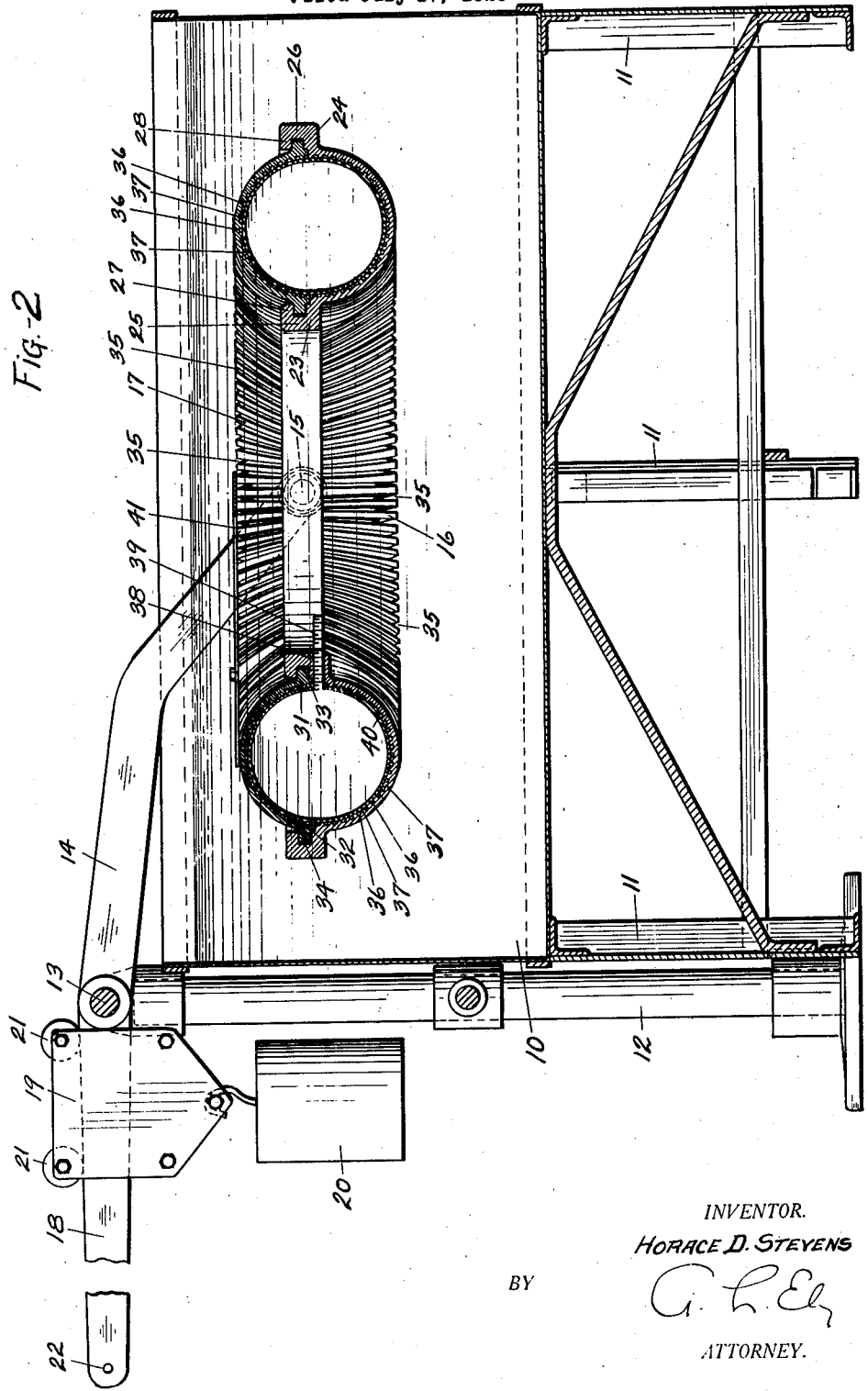

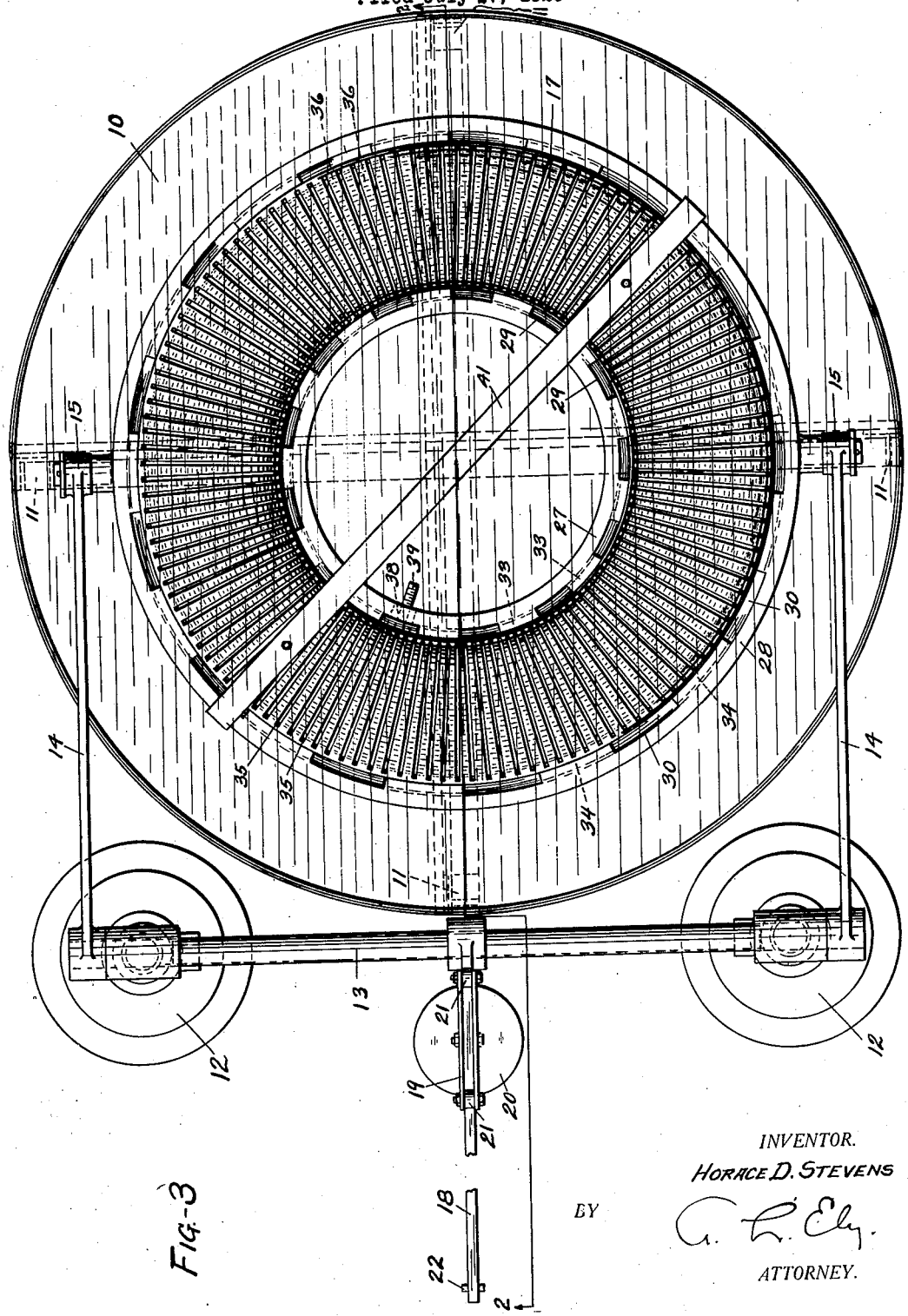

1,699,481

UNITED STATES PATENT OFFICE.

HORACE D. STEVENS, OF AKRON, OHIO, ASSIGNOR TO THE FIRESTONE TIRE AND RUBBER COMPANY, OF AKRON, OHIO, A CORPORATION OF OHIO.

TUBE-TESTING DEVICE.

Application filed July 17, 1925. Serial No. 44,378.

This invention relates to testing devices such as are employed for testing molded inner tubes for leaks.

The chief object of the invention is to provide a testing cage for molded inner tubes adapted to withstand high pressures, and constructed for effectively permitting air leakage from the tube to bubble up through a liquid.

Heretofore testing cages for this purpose have been constructed of wire, but their use has not been successful, due to distortion and breakage of the cages at sufficiently high pressures for testing the tubes. It has been found that to effectively test inner tubes, pressures up to 150 pounds per square inch are required in the tube. At such pressures, the wire cages heretofore employed to limit expansion of the tubes are subject to considerable distortion and breakage.

The above and other objects of the invention are obtained by the device illustrated in the accompanying drawings and described in detail below. It is to be understood that the invention is not limited to the specific construction shown and described.

Of the accompanying drawings:

Figure 1 is a side elevation partly in section of a device embodying the invention, the upper section of the testing cage being removed in readiness for mounting an inner tube in the device;

Figure 2 is a longitudinal vertical section through the device as on line 2—2 of Figure 3 with the parts in tube-testing relation; and Fig. 3 is a plan of the device.

Referring to the drawings, 10 represents a circular testing tank containing a liquid such as water and supported in any suitable manner as by legs 11, 11. Adjacent one side of tank 10 is a pair of standards 12, 12 having journaled on the tops thereof a rock shaft 13 on which is secured a pair of arms 14, 14 extending over tank 10 and on which is pivotally suspended, as at 15, 15, a lower section 16 of a testing cage whereby the latter may be lowered into the liquid in tank 10, the lower section 16 being arranged to receive and support an upper section 17 in mating relation thereon as will be explained.

Secured on shaft 13 is an arm 18 extending away from tank 10 and having a movable carriage 19 thereon on which is suspended a counter-weight 20 for use in operating the cage into and out of tank 10. The carriage 19 has rollers 21, 21 thereon to facilitate its movement on arm 18, and a stop 22 is provided on the outer end of the arm 18 to prevent movement of the carriage off of the arm.

The lower section 16 of the cage is formed from a single casting of hollow annular shape provided with inner and outer horizontal flanges 23 and 24 with inner and outer vertical flanges 25 and 26 and with inner and outer raised horizontal flanges 27 and 28 provided with equally spaced slots 29, 29 and 30, 30. The upper section 17 is formed from a single casting of hollow annular shape provided with inner and outer flanges 31 and 32 provided with spaced projections or lugs 33 and 34 arranged to pass respectively through slots 29 and 30 to seat on flanges 24 and 25, and upon rotation of section 17 on section 16 to engage under flanges 27 and 28 to provide a bayonet joint between said sections to secure them together in the mating relation shown in Figure 2.

Both sections 16 and 17 are provided with closely spaced radial slots 35, 35 extending from flange to flange and through which leakage from the tube through the cage can take place. Both sections are also provided with a series of circumferential grooves 36, 36 extending parallel to the flanges whereby the slots 35 and grooves 36 will define closely spaced projections 37, 37 supporting the tube to be tested so that the grooves 36 provide paths for conducting leaking air to the slots 35, and thus through the cage. As shown at 38, section 16 has a slot therein through which the valve stem 39 of an inner tube 40 may extend. To facilitate handling of section 17, a strap 41 is secured across the top thereof.

In use, the parts will originally be in the positions shown in Figure 1. The inner tube to be tested is then inserted in the lower section 16, the stem 39 being properly positioned in slot 38. The other section 17 is then mounted on section 16 and locked in place as will be understood. The tube is now expanded by air pressure up to 150 pounds and the cage lowered into tank 10 whereby the fact as to whether the tube is leaky or not can be ascertained and if leaky, the location thereof can be determined.

After the test, the cage is elevated, the tube 40 deflated, and section 17 is rotated and lifted off of section 16, the tested tube being removed, another inserted and the operations repeated as above.

It has been found that a cage constructed as above is a highly effective testing unit and will withstand pressures up to 200 pounds without substantial distortion or breakage. It will appear that modifications of the device may be resorted to without departing from the spirit thereof or the scope of the appended claims.

What is claimed is:

1. A testing cage for inflatable tubes comprising a pair of hollow annular sections each formed of a single casting having cooperating inner and outer flanges adapted to be connected together by bayonet type locking means to provide a tube-containing space and each section being provided with closely spaced radial slots extending from flange to flange and with closely spaced circumferential grooves on its inner surface.

2. A testing cage for inflatable tubes comprising a pair of hollow annular sections adapted to be secured in mating relation to provide a tube-containing space, each section being formed of a single casting provided with closely spaced radial slots and closely spaced circumferential grooves on its inner surface.

3. A testing cage for inflatable articles comprising a plurality of cage sections adapted to be secured about the article and each formed with closely spaced slots and closely spaced grooves on the inner surfaces of the sections extending transversely of the slots.

HORACE D. STEVENS.